US011857877B2

(12) United States Patent
Liang et al.

(10) Patent No.: US 11,857,877 B2
(45) Date of Patent: Jan. 2, 2024

(54) AUTOMATIC IN-GAME SUBTITLES AND CLOSED CAPTIONS

(71) Applicants: Advanced Micro Devices, Inc., Santa Clara, CA (US); ATI Technologies ULC, Markham (CA)

(72) Inventors: Wei Liang, Markham (CA); Ilia Blank, Markham (CA); Patrick Fok, Markham (CA); Le Zhang, Markham (CA); Michael Schmit, Santa Clara, CA (US)

(73) Assignees: ATI Technologies ULC, Markham (CA); Advanced Micro Devices, Inc., Santa Clara, CA (US)

(*) Notice: Subject to any disclaimer, the term of this patent is extended or adjusted under 35 U.S.C. 154(b) by 0 days.

(21) Appl. No.: 17/561,477

(22) Filed: Dec. 23, 2021

(65) Prior Publication Data

US 2023/0201717 A1    Jun. 29, 2023

(51) Int. Cl.
*A63F 13/53* (2014.01)
*A63F 13/87* (2014.01)
*G10L 17/26* (2013.01)
*G10L 17/06* (2013.01)

(52) U.S. Cl.
CPC .............. *A63F 13/53* (2014.09); *A63F 13/87* (2014.09); *G10L 17/06* (2013.01); *G10L 17/26* (2013.01); *A63F 2300/303* (2013.01); *A63F 2300/572* (2013.01)

(58) Field of Classification Search
CPC .... A63F 13/53; A63F 13/87; A63F 2300/303; A63F 2300/572; G10L 17/06; G10L 17/26
See application file for complete search history.

(56) References Cited

U.S. PATENT DOCUMENTS

| 10,304,458 B1* | 5/2019 | Woo ......................... G10L 17/02 |
| 11,295,497 B2* | 4/2022 | Castellucci ............... G06T 7/33 |
| 2012/0275761 A1* | 11/2012 | Li ............................. H04N 5/92 386/239 |
| 2012/0293712 A1* | 11/2012 | Mountain ............ H04N 21/435 348/E7.001 |
| 2016/0170709 A1* | 6/2016 | Jang ................. H04N 21/47205 715/727 |
| 2016/0357746 A1* | 12/2016 | Koul ........................ G10L 15/26 |
| 2017/0062010 A1* | 3/2017 | Pappu .................. G11B 27/031 |
| 2017/0243520 A1* | 8/2017 | Teshima .................. G10L 15/26 |
| 2019/0314728 A1* | 10/2019 | Sullivan ................ A63F 13/355 |

(Continued)

*Primary Examiner* — Dmitry Suhol
*Assistant Examiner* — Carl V Larsen
(74) *Attorney, Agent, or Firm* — Hickman Becker Bingham Ledesma LLP

(57) ABSTRACT

An approach is provided for a gaming overlay application to provide automatic in-game subtitles and/or closed captions for video game applications. The overlay application accesses an audio stream and a video stream generated by an executing game application. The overlay application processes the audio stream through a text conversion engine to generate at least one subtitle. The overlay application determines a display position to associate with the at least one subtitle. The overlay application generates a subtitle overlay comprising the at least one subtitle located at the associated display position. The overlay application causes a portion of the video stream to be displayed with the subtitle overlay.

19 Claims, 5 Drawing Sheets

(56) References Cited

U.S. PATENT DOCUMENTS

| | | | |
|---|---|---|---|
| 2020/0312025 A1* | 10/2020 | Leppänen | G06F 3/011 |
| 2020/0388261 A1* | 12/2020 | Candelore | G10H 1/0083 |
| 2021/0074298 A1* | 3/2021 | Coeytaux | H04N 7/147 |
| 2021/0201953 A1* | 7/2021 | Takahashi | G09G 5/377 |
| 2021/0334547 A1* | 10/2021 | Cohen-Tidhar | G06V 10/82 |
| 2022/0005477 A1* | 1/2022 | Ma | G06F 40/58 |
| 2022/0132217 A1* | 4/2022 | Aher | G06V 30/262 |

\* cited by examiner

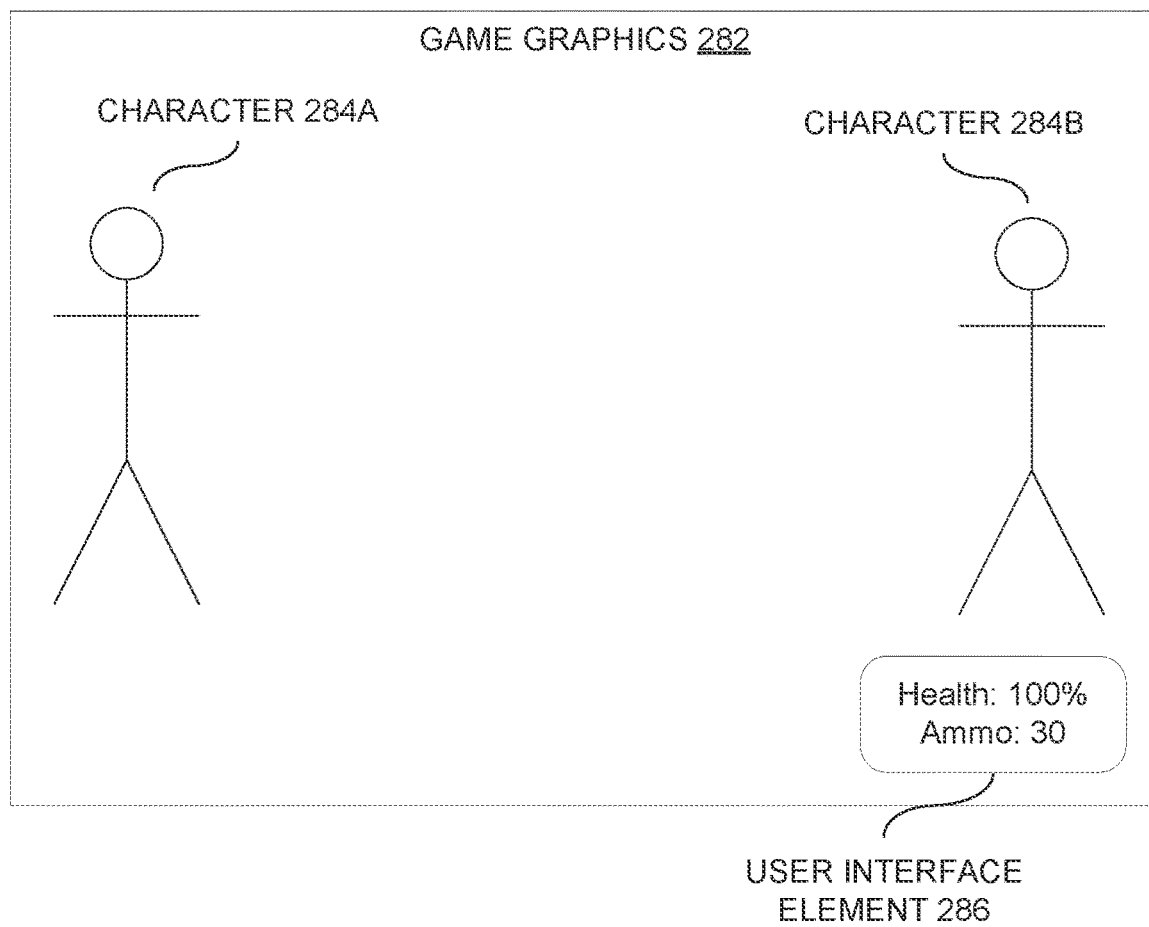

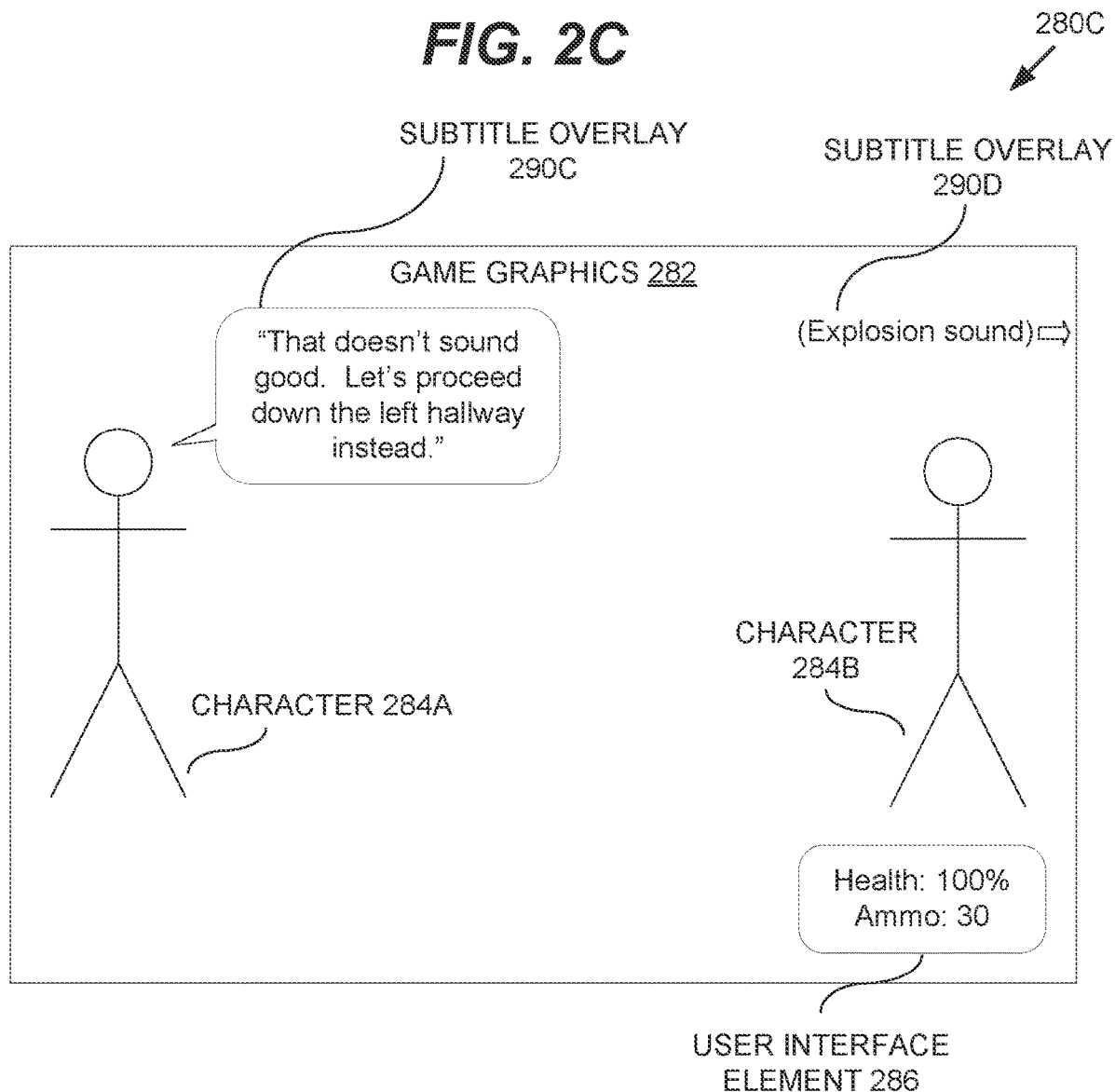

AUTOMATIC IN-GAME SUBTITLES AND CLOSED CAPTIONS

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

Subtitles or closed captions for interactive content can provide a key accessibility feature for users with hearing impairments or difficult listening environments. Users that are deaf, hard of hearing, or affected by tinnitus or other hearing conditions may not be able to fully understand audio cues and spoken dialogue. Noisy environments can exacerbate the problem, such as when a user is using public transport, traversing crowded spaces, or is in proximity to construction, traffic, musical performances, or other sources of background noise. Conversely, in environments where silence must be maintained, such as at offices or libraries, or late at night when noise ordinances may be in effect, audio may need to be played at low volume or muted, rendering audio difficult to hear clearly. While headphones may assist in hearing audio, headphones may be misplaced, forgotten, or incompatible with hearing aids or other devices. Even when spoken dialogue is clearly audible to the user, it may be spoken in a foreign language or in a dialect or accent that is not readily understood by the user. In these cases, subtitles or closed captions can assist the user in better understanding audio.

By providing subtitles and closed captions for interactive content such as video and computer games, greater accessibility and more efficient gameplay interactions can be provided for a broader range of users. However, since video and computer games are programmed in disparate environments using different game engines and development methodologies, there is no universal standard for presenting subtitles and closed captions within games. Thus, games may not always support subtitles natively. Even when subtitles or closed captions are supported natively in-game, only a limited number of languages may be supported, or subtitles may only display in limited portions of game content, such as only in predetermined cut scenes. Thus, there is a need for an approach that provides subtitles or closed captions for computer and video games in a more flexible manner.

BRIEF DESCRIPTION OF THE DRAWINGS

Implementations are depicted by way of example, and not by way of limitation, in the figures of the accompanying drawings and in which like reference numerals refer to similar elements.

FIG. 2A is a diagram that depicts an example graphical user interface (GUI) of a video game application.

FIG. 2C is a diagram that depicts an example graphical user interface (GUI) of a video game application with automatic in-game subtitles positioned in proximity to sound sources.

DETAILED DESCRIPTION

In the following description, for the purposes of explanation, numerous specific details are set forth in order to provide a thorough understanding of the implementations. It will be apparent, however, to one skilled in the art that the implementations may be practiced without these specific details.

I. Overview
II. Architecture
III. Example Game Application Graphical User Interfaces
IV. Automatic In-Game Subtitle Generation Process

I. Overview

An approach is provided for a gaming overlay application to provide automatic in-game subtitles and/or closed captions for video game applications. The overlay application accesses an audio stream and a video stream generated by an executing game application. In implementations, the video stream comprises frames of image data that are rendered during the executing of the game application. The overlay application processes the audio stream through a text conversion engine, which, in implementations, includes a speech-to-text engine, to generate at least one subtitle. The overlay application determines a display position to associate with the at least one subtitle. The overlay application generates a subtitle overlay comprising the at least one subtitle located at the associated display position. The overlay application causes at least a portion of the video stream to be displayed with the subtitle overlay.

Techniques discussed herein enable a gaming overlay application to analyze real-time audio streams from a video game to generate subtitles to be displayed, even when the video game does not natively support subtitles. By using various cues such as multi-channel surround sound information and machine learning based voice profile matching, dialogue and audio cues are associated with specific characters, multiplayer users, or other elements shown in-game, and subtitles are positioned onscreen at a user preferred location or in proximity to the associated sound source. In this manner, a user quickly identifies a speaker and their associated dialogue even if audio is difficult to hear or muted. This enables the user to react more quickly and efficiently by understanding and reacting to audio cues even with hearing impediments or challenging listening environments. Further, since the techniques are applicable to any video game that generates audio, the described techniques can be used with video games that do not natively support subtitles. In implementations, subtitles are shown in a variety of contexts, including cut scenes, in matching lobbies or during gameplay.

II. Architecture

Figure 1:
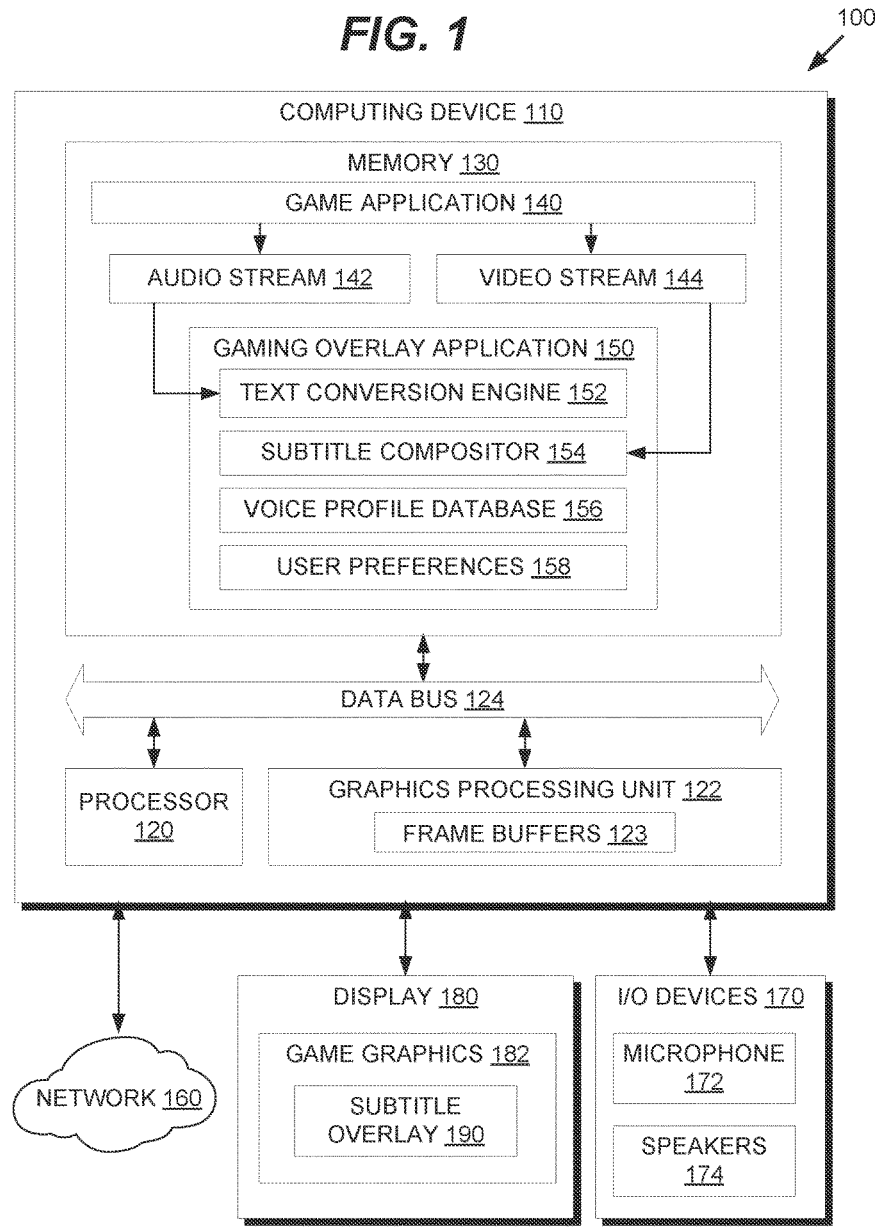
FIG. 1 is a block diagram that depicts a system for implementing automatic in-game subtitles, as described herein.

FIG. 1 is a block diagram that depicts a system 100 for implementing automatic in-game subtitles, as described herein. Subtitles, as used in the present disclosure, include transcriptions or translations of dialogue or speech of a video, video game, etc. and descriptions of sound effects, musical cues or other relevant audio information from the video/video game. Thus, references to subtitles also include closed captions or subtitles with additional context such as speaker identification and non-speech elements such as descriptions of sound effects and audio cues. In implementations, system 100 includes computing device 110, network 160, input/output (I/O) devices 170, and display 180. In implementations, computing device 110 includes processor 120, graphics processing unit (GPU) 122, data bus 124, and memory 130. In implementations, GPU 122 includes memory for storing one or more frame buffers 123. In implementations, memory 130 stores game application 140 and gaming overlay application 150. In implementations, game application 140 outputs audio stream 142 and video stream 144. Gaming overlay application 150 includes text conversion engine 152, subtitle compositor 154, voice profile database 156, and user preferences 158. I/O devices 170 include microphone 172 and speakers 174. Display 180 includes an interface to receive game graphics 182 from computing device 110. In implementations, game graphics 182 includes subtitle overlay 190. The components of system 100 are only exemplary and any configuration of system 100 is usable according to the requirements of game application 140.

Game application 140 is executed on computing device 110 by one or more of processor 120, GPU 122, or other computing resources not specifically depicted. Processor 120 is any type of general-purpose single or multi core processor, or a specialized processor such as application-specific integrated circuit (ASIC) or field programmable gate array (FPGA). In implementations, more than one processor 120 is present. GPU 122 is any type of specialized hardware for graphics processing, which is addressable using various graphics application programming interfaces (APIs) such as DirectX, Vulkan, OpenGL, and OpenCL. In implementations, GPU 122 includes frame buffers 123, where finalized video frames are stored before outputting to display 180. Data bus 124 is any high-speed interconnect for communications between components of computing device 110, such as a Peripheral Component Interconnect (PCI) Express bus, an Infinity Fabric, or an Infinity Architecture. Memory 130 is any type of memory, such as a random access memory (RAM) or other storage device.

As depicted in FIG. 1, game application 140 generates audio stream 142 and video stream 144, corresponding to real-time audio and video content. In some implementations, audio stream 142 and video stream 144 are combined into a single audiovisual stream. Audio stream 142 corresponds to internally generated in-game audio and in implementations includes multiple channels for surround sound and/or 3D positional audio information. In implementations, game application 140 supports multiplayer gaming via network 160. In implementations, voice chat streams from game participants are embedded in audio stream 142, either combined with existing in-game audio or as separate channels to be mixed by the operating system. For example, microphone 172 is used to record voice chat from participants. While gaming overlay application 150 is depicted as receiving audio stream 142 from game application 140, in implementations, audio stream 142 is received from an audio mixer output provided by an operating system of computing device 110.

In implementations, video stream 144 corresponds to in-game visuals which are generated by GPU 122 and exposed for access via a video capture service provided by GPU 122. For example, completed frame buffers 123 are buffered in memory 130 for access by a video streaming application. For simplicity, gaming overlay application 150 is depicted as accessing video stream 144 from game application 140.

In implementations, gaming overlay application 150 corresponds to any program that includes functionality to display an overlay on top of in-game video content. This includes programs provided by the manufacturer of GPU 122, such as Radeon Software Crimson ReLive Edition or GeForce Experience, gaming clients such as Steam with Steam Overlay, voice chat tools such as Discord, or operating system features such as Windows Xbox Game Bar. In implementations, gaming overlay application allows the user to enable options, such as displaying in-game overlay for configuring video capture, video streaming, audio mixing, voice chat, game profile settings, friend lists, and other options.

In implementations, gaming overlay application 150 includes functionality for video and audio capture and streaming. In implementations, this functionality is utilized to capture audio stream 142 and video stream 144 from game application 140. In implementations, gaming overlay application 150 is further extended to support automatic in-game subtitles by implementing or accessing text conversion engine 152 and subtitle compositor 154. In implementations, text conversion engine 152 accesses audio stream 142 and generates text corresponding to detected speech or sound effects. For example, text conversion engine 152 includes a speech-to-text engine and a video game sound effect detection engine. Example speech-to-text engines include DeepSpeech, Wav2Letter++, OpenSeq2Seq, Vosk, and ESPnet. By using alternative models that are trained with video game sound effects and other non-dialogue audio cues, the speech-to-text engines are also adaptable for use as video game sound effect detection engines.

In implementations, to provide real-time or near real-time processing, audio stream 142 is loaded into buffers of a limited size for processing through text conversion engine 152. For example, the buffers are capped at a maximum size or length, such as no longer than 5 seconds, and buffers are split opportunistically according to pauses or breaks detected in audio stream 142. In this manner, dialogue is processed in buffers containing short dialogue phrases and processed for displaying as quickly as possible.

In implementations, once subtitle text is obtained from text conversion engine 152, subtitle compositor 154 determines display positions associated with the subtitles. For example, in implementations, user preferences 158 define a preferred area of the screen for displaying subtitles, such as near the bottom of the screen. In implementations, video stream 144 is scanned for user interface elements of game application 140, such as health indicators or other in-game indicators that are preferably kept unobscured, and these areas are marked as exclusion areas or keep-out zones that should not display subtitles. For example, computer vision models are used to detect common videogame user interface elements such as health indicators, mini maps, compasses, quest arrows, ammunition and resource counters, ranking or score information, timers or clocks, and other heads-up display (HUD) elements. In implementations, subtitle compositor 154 positions the subtitles in proximity to an in-game object associated with the in-game speaker, as described in conjunction with FIG. 2C below. In implementations, to determine the identity of the in-game speaker, voices detected in audio stream 142 are matched to machine learned classifications stored in voice profile database 156. In implementations, spatial audio cues from audio stream 142 are utilized to triangulate a position of an in-game object associated with the in-game speaker.

While text conversion engine 152 and voice profile database 156 are shown as integral to gaming overlay application 150, in implementations, components of gaming overlay application 150 are implemented by a remote service (e.g., cloud server) that is accessed via network 160. This enables offloading of various tasks, such as text conversion, foreign language translation, and/or machine learning matching tasks to external cloud services.

After subtitle compositor 154 determines a display position for the subtitles generated from text conversion engine 152, a subtitle overlay 190 is generated accordingly. Display characteristics of the subtitles, such as font color and size, are set according to one or more of user preferences 158, readability considerations, or speaker intent detected from audio stream 142 as discussed further herein. To cause subtitle overlay 190 to be combined with a portion of the corresponding to video stream 144, subtitle overlay 190 is merged with data from one or more frame buffers 123 that are finalized prior to output to display 180, for example as one or more processing steps in a rendering pipeline within GPU 122, or by a desktop compositor of an operating system running on computing device 110. In this manner, subtitle support is provided via gaming overlay application 150 even when game application 140 does not natively support subtitles.

III. Example Game Application Graphical User Interfaces

Referring now to FIG. 2A, an example display 280A is illustrated, which corresponds to display 180 from FIG. 1. As depicted in display 280A, game graphics 282 corresponding to game graphics 182 is shown. Display 280A represents a display of game application 140 when subtitle overlay 190 is not generated or is disabled, or when gaming overlay application 150 is not running. In these cases, no subtitles appear and only in-game elements are shown, including character 284A positioned to the left side of display 280A, character 284B positioned to the right side of display 280A, and user interface element 286 displaying gameplay status including user health and ammo.

Figure 2B:
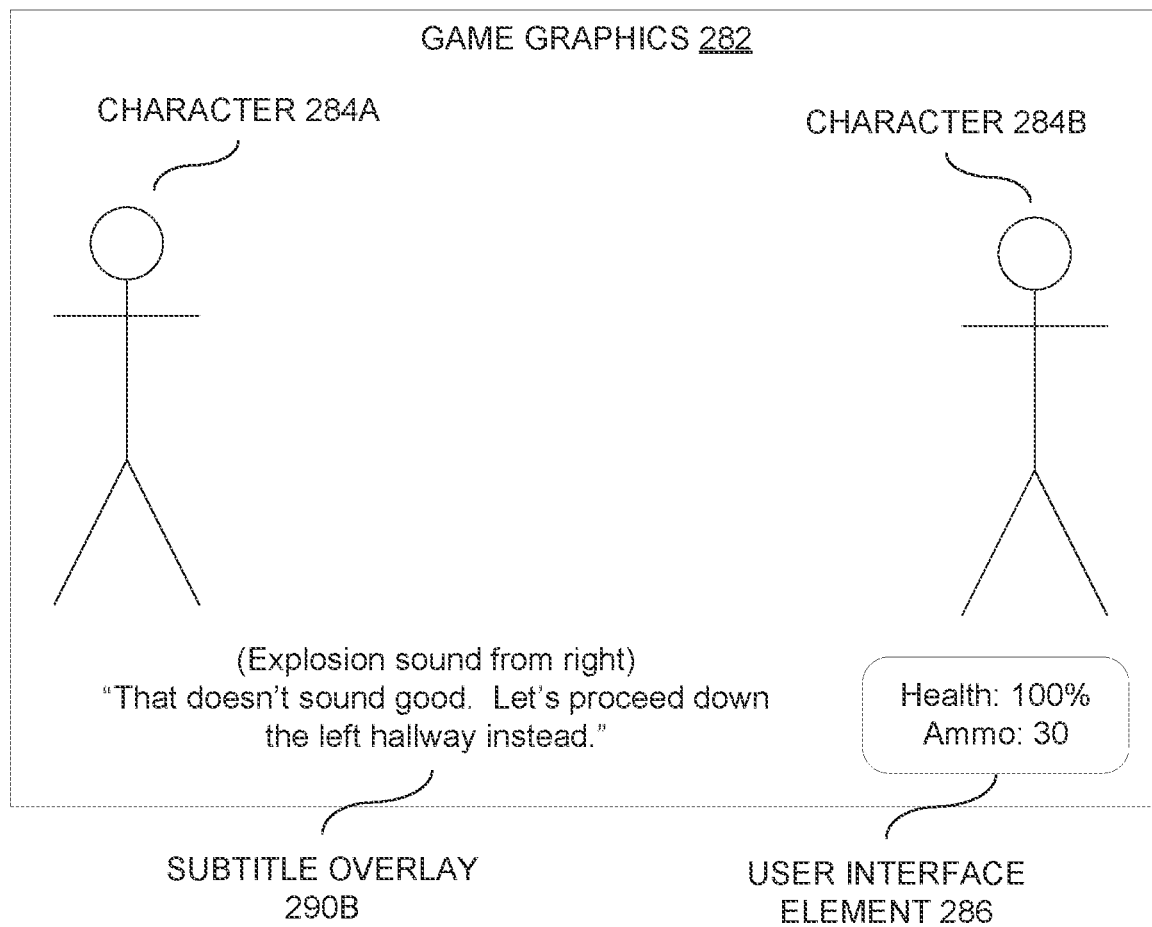
FIG. 2B is a diagram that depicts an example graphical user interface (GUI) of a video game application with automatic in-game subtitles.

Referring now to FIG. 2B, an example display 280B is illustrated, which corresponds to display 180 from FIG. 1. As depicted in display 280B, subtitle overlay 290B is overlaid on top of game graphics 282 and includes the subtitles of "(Explosion sound from the right)" and "That doesn't sound good. Let's proceed down the left hallway instead." Note that subtitle overlay 290B is positioned near the bottom of display 280B, which is set, in implementations, according to user preferences 158. Further, note that subtitle overlay 290B avoids placement of subtitles over user interface element 286, thereby maintaining visibility of vital in-game information.

Referring now to FIG. 2C, an example display 280C is illustrated, which corresponds to display 180 from FIG. 1. As depicted in display 280C, subtitle overlay 290C and 290D are overlaid on top of game graphics 282. Subtitle overlay 290C contains the subtitle "That doesn't sound good. Let's proceed down the left hallway instead." Further, subtitle overlay 290C is positioned to be proximate to an in-game object (e.g., character 284A) associated with an in-game speaker and appears in a speech bubble. Subtitle overlay 290D contains the closed caption "(Explosion sound)" and is positioned proximate to the right of display 280C. In this example, subtitle overlay 290D points offscreen since the explosion itself was determined to occur at a position to the right of the user that is not visible in game graphics 282.

In implementations, the position of audio sources in the game world are estimated according to positional cues in audio stream 142. For example, stereo audio panning position is used to determine whether an audio source is located to the left, right, or center of the user's current viewpoint in the game world represented by video stream 144. When multichannel or positional 3D audio is available, the position of audio sources is estimated with greater accuracy, such as in front, behind, above, or below the user's current viewpoint. In implementations, referring to FIG. 1, multichannel or positional 3D audio in audio stream 142 indicates that the current in-game speaker is heard primarily from the left channels of speakers 174. Thus, the in-game object associated with the in-game speaker is more likely be character 284A, to the left, rather than character 284B, to the right. Similarly, audio stream 142 indicates that the explosion sound is heard primarily from the right channels of speakers 174. However, since no explosion graphic is detected in video stream 144, the explosion itself is determined to be offscreen and further to the right. These positional audio cues are factors used to determine the positioning of subtitle overlays 290C and 290D within the display such that they are proximate to their sound source or in-game object associated with the in-game speaker. For example, sounds heard primarily from center or rear surround channels indicate sound sources positioned in the front center or behind the user in a game world rendered by game application 140, whereas sounds heard primarily from height channels indicate sound sources positioned above the user.

IV. Automatic In-Game Subtitle Generation Process

Figure 3:
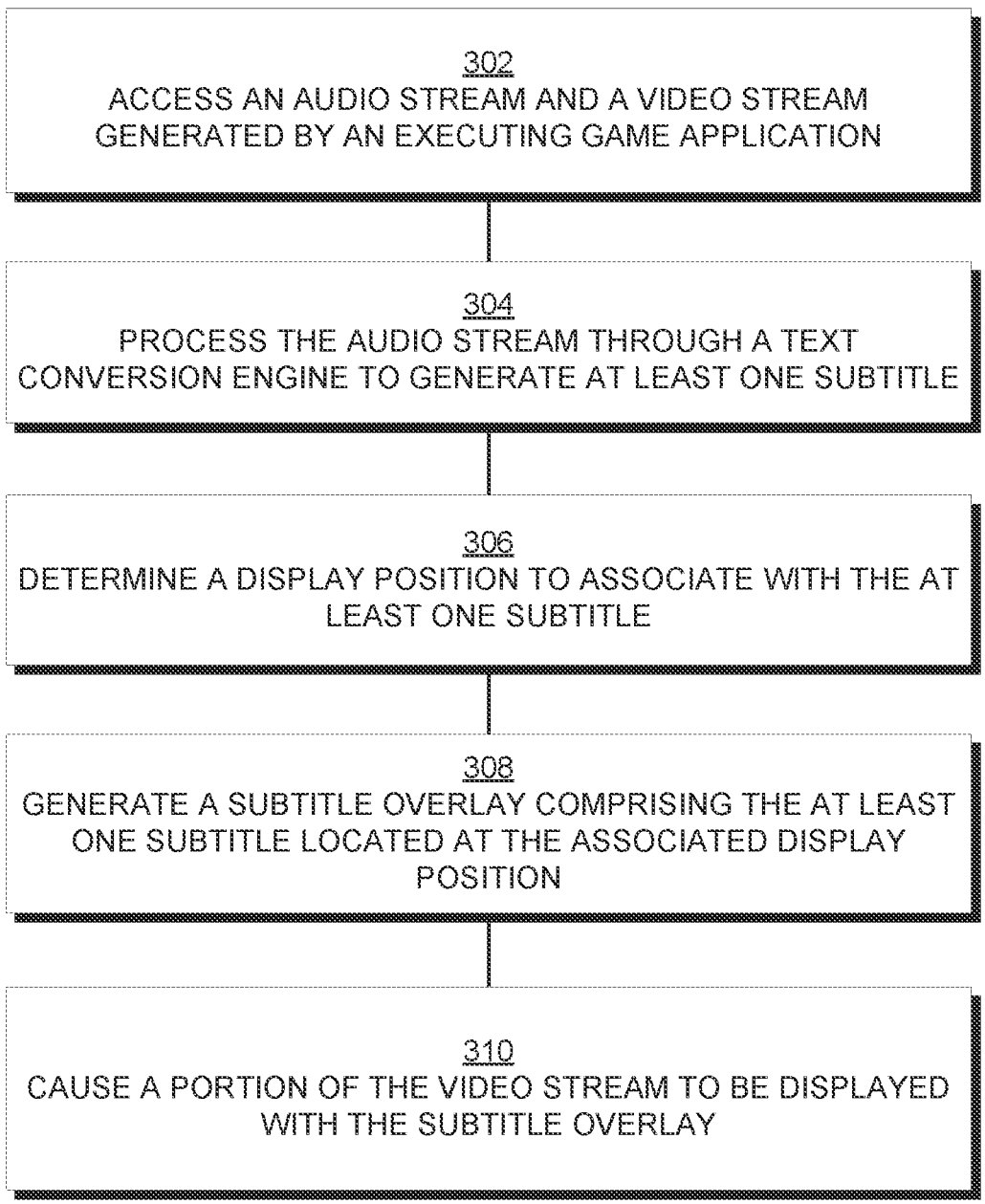
FIG. 3 is a flow diagram that depicts an approach for implementing automatic in-game subtitles.

To illustrate an example process for implementing automatic in-game subtitles in a gaming overlay application, flow diagram 300 of FIG. 3 is described with respect to FIG. 1 and FIG. 2B and FIG. 2C. As described above, display 280B and 280C reflect examples of display 180 after gaming overlay application 150 generates subtitle overlay 190 for displaying with game graphics 182.

Flow diagram 300 depicts an approach for implementing automatic in-game subtitles in a gaming overlay application. In implementations, blocks 302, 304, 306, 308, and 310 are performed by one or more processors. In implementations, blocks 302, 304, 306, 308 and 310 are performed by a single processor of a computing device, similar to FIG. 1. In implementations, one or more of the blocks of flow diagram 300 are performed by one or more cloud servers or other computing devices distributed across a wireless or wired network.

In block 302, an audio stream 142 and video stream 144 generated as the result of executing game application 140 are accessed. In implementations, a gaming overlay application executing on a processor receives the audio stream and video stream. In implementations, the processor executes gaming overlay application 150 concurrently with game application. In some implementations, game application 140 executes on a remote server. For example, when using a cloud-based gaming streaming service, audio stream 142 and video stream 144 are received from a remote server via network 160.

In block 304, the audio stream 142 is processed through a text conversion engine 152 to generate at least one subtitle. As discussed above, in implementations, text conversion engine 152 is part of gaming overlay application 150, and in other implementations, text conversion engine 152 is accessed using a cloud-based service via network 160. Alternatively, both a cloud-based and an internal text conversion engine 152 are provided, and the internal version is utilized when network 160 is unavailable or disconnected. In implementations, text conversion engine 152 also supports translation of text into the user's preferred native language and local dialect, which is defined in user preferences 158. Since translation features require significant processing resources, in implementations, offloading of text conversion engine 152 to a cloud-based service helps to minimize processing overhead that is detrimental to the performance of game application 140.

In block 306, a display position is determined to associate with the at least one subtitle from block 304. In implementations, subtitle compositor 154 uses one or more factors to determine the display position. One factor includes a user defined preference for subtitle location, such as near the bottom of the screen. This user preference is retrieved from user preferences 158. Another factor includes avoiding exclusion areas detected in video stream 144. For example, as previously described, video stream 144 is scanned for user interface elements generated by game application 140, and the portion of the display that includes these user interface elements are marked as exclusion areas that should not include subtitles.

Yet another factor includes positioning the subtitle in proximity to the sound source or in-game speaker. For example, computer vision processing is performed to identify in-game characters, multiplayer users, and other objects within the video stream 144 that are potential sound sources associated with subtitles or closed captions. Once characters and objects are identified, the at least one subtitle from block 304 is matched to its most likely sound source and positioned proximate to its sound source within the video stream 144.

Matching to the most likely sound source for the at least one subtitle is based on various considerations. As discussed above, in implementations matching is based on triangulation using spatial audio cues from audio stream 142. Thus, in-game objects (e.g., characters) positioned in the in-game world consistent with the spatial audio cues are more strongly correlated with the sound source.

Another consideration includes matching voice traits to classifications in voice profile database 156 and confirming whether the matched classifications are consistent with the visual characteristics of a potential sound source. For example, voice profile database 156 includes classifications such as age range, gender, and dialect. Using machine learning techniques, traits analyzed from audio stream 142 and matched to voice profile database 156 are used to classify the in-game speaker as more or less likely to be a child, an adult, an elderly person, a male, a female, or a speaker with a regional dialect. The computer vision processing described above is used to confirm whether a potential sound source, or in-game character, is consistent with the matched classifications. For example, if audio stream 142 is classified as likely to be "female" in voice profile database 156, and computer vision processing of the video stream 144 identifies a potential in-game character as likely to be a female character, then matching the potential in-game character to the at least one subtitle is more strongly correlated.

Yet another consideration includes matching audio stream 142 to a specific user. For example, as discussed above, in implementations game application 140 is a multiplayer game wherein participants use voice chat to communicate with other participants. In this case, audio stream 142 includes multiple voice chat streams associated with specific users, and thus the user speaking at any given time is readily determined according to the originating voice chat stream. If audio stream 142 is only available as a single mixed stream, then the other considerations described above are still usable to determine the in-game speaker. Further, since game overlay application 150 includes identifying information such as usernames or handles for each participant, the subtitles also include such identifying information when available.

In block 308, a subtitle overlay 190 is generated comprising the at least one subtitle from block 304 located at the associated display position from block 306. As described above, subtitle compositor 154 generates subtitle overlay 190 along with various visual characteristics of the subtitles. In implementations, these visual characteristics include font attribute (e.g. italic, bold, outline), font color, font size, and speech bubble type. Speech bubble type includes, for example, speech bubbles, floating text, or other text presentation methods. Visual characteristics are set according to user preferences 158, for example user preferred font size and color. Visual characteristics are set according to readability considerations, for example by ensuring that the subtitles have high contrast according to colors in the associated area of video stream 144. For example, if the subtitles are positioned in an area having mostly bright or light colors, then the subtitles use darker colors or a dark outline for greater visibility and readability. Visual characteristics are also set according to the in-game speaker, for example by mapping specific font colors for each in-game character.

In implementations, visual characteristics are also set according to speaker intent detected from audio stream 142. For example, audio stream 142 is analyzed for loudness, speech tempo, syllable emphasis, voice pitch, and other elements to determine whether the in-game speaker is calm, and in this case the display characteristics use default values. On the other hand, if analysis of audio stream 142 determines that the in-game speaker is excited or conveying an urgent message, then the display characteristics emphasize this by using a bold font, a larger font size, or a speech bubble that is emphasized using spiked lines or other visual indicators. Thus, the intent of the speaker is better understood in a visual manner.

In block 310, a portion of video stream 144 is caused to be displayed with subtitle overlay 190. In implementations, as discussed above, this is performed by modifying a rendering pipeline within GPU 122, or using a desktop compositor of an operating system, among other methods. Thus, display 180 outputs game graphics 182 with subtitle overlay 190. As shown in FIG. 2B, the subtitle overlay 290B is placed according to a user preference for subtitle placement. Alternatively, as shown in FIG. 2C, the subtitle overlay 290C and 290D are placed according to proximity to the sound source. In this manner, subtitle support is provided via gaming overlay application 150 even when game application 140 does not natively support subtitles.

The invention claimed is:
1. A method comprising:
 accessing an audio stream and a video stream generated by an executing game application;
 generating, at a text conversion engine circuitry, at least one subtitle based on the audio stream;

determining a display position of the at least one subtitle by analyzing the video stream for exclusion areas that contain user interface elements of the executing game application;

generating a subtitle overlay comprising the at least one subtitle located at the display position; and causing a portion of the video stream to be displayed with the subtitle overlay.

2. The method of claim 1, wherein processing the audio stream loads the audio stream into size limited buffers for real-time or near real-time processing.

3. The method of claim 1, further comprising determining the display position by analyzing the audio stream to identify an in-game speaker associated with the at least one subtitle and setting the display position proximate to an in-game object associated with the in-game speaker in the video stream.

4. The method of claim 3, wherein analyzing the audio stream to identify the in-game speaker includes matching at least one trait of the in-game speaker to an associated classification in a voice profile database.

5. The method of claim 4, wherein the at least one trait comprises age, gender, and dialect.

6. The method of claim 3, further comprising determining the display position by processing the video stream with computer vision to identify the in-game speaker.

7. The method of claim 3, wherein the audio stream comprises multichannel or positional audio, and wherein analyzing the audio stream to identify the in-game speaker includes locating the in-game object associated with the in-game speaker by triangulation from the multichannel or positional audio.

8. The method of claim 1, wherein generating the subtitle overlay includes configuring one or more visual characteristics of the at least one subtitle.

9. The method of claim 8, wherein the one or more visual characteristics include at least one of: font attribute, font color, font size, and speech bubble type.

10. The method of claim 8, wherein the one or more visual characteristics are determined based on at least one of: stored user preferences, readability when the video stream is displayed with the subtitle overlay, and speaker sentiment analyzed from the audio stream.

11. The method of claim 1, wherein the executing game application is a multiplayer game, and wherein the audio stream includes voice chat from participants in the multiplayer game.

12. The method of claim 1, further comprising determining the display position by accessing stored user preferences for subtitle positioning.

13. A system comprising:
one or more processors configured to:
access an audio stream and a video stream generated by an executing game application;
generate, at a text conversion engine circuitry, at least one subtitle based on the audio stream;
determine a display position of the at least one subtitle by analyzing the video stream for exclusion areas that contain user interface elements of the executing game application;
generate a subtitle overlay comprising the at least one subtitle located at the display position; and
cause a portion of the video stream to be displayed with the subtitle overlay.

14. The system of claim 13, wherein the one or more processors are configured to process the audio stream by loading the audio stream into size limited buffers for real-time or near real-time processing.

15. The system of claim 13, wherein the one or more processors are configured to determine the display position by analyzing the audio stream to identify an in-game speaker associated with the at least one subtitle and setting the display position proximate to an in-game object associated with the in-game speaker in the video stream.

16. The system of claim 15, wherein the one or more processors are configured to access the audio stream by accessing multichannel or positional audio of the audio stream, and wherein the one or more processors are configured to analyze the audio stream to identify the in-game speaker by locating the in-game object associated with the in-game speaker by triangulation from the multichannel or positional audio of the audio stream.

17. One or more non-transitory computer readable media comprising instructions executable by one or more processors, which cause the one or more processors to:
access an audio stream and a video stream generated by an executing game application;
generate, at a text conversion engine circuitry, at least one subtitle based on the audio stream;
determine a display position of the at least one subtitle by analyzing the video stream for exclusion areas that contain user interface elements of the executing game application;
generate a subtitle overlay comprising the at least one subtitle located at the display position; and
cause a portion of the video stream to be displayed with the subtitle overlay.

18. The one or more non-transitory computer readable media of claim 17, wherein the instructions, when executed by the one or more processors, further cause the processing of the audio stream to load the audio stream into size limited buffers for real-time or near real-time processing.

19. The one or more non-transitory computer readable media of claim 17, wherein the instructions, when executed by the one or more processors, further cause determining of the display position by analyzing the audio stream to identify an in-game speaker associated with the at least one subtitle and set the display position proximate to an in-game object associated with the in-game speaker in the video stream.

* * * * *